(12) United States Patent
Fang et al.

(10) Patent No.: US 12,315,511 B2
(45) Date of Patent: May 27, 2025

(54) AUDIO INFORMATION PROCESSING METHOD, APPARATUS, ELECTRONIC DEVICE AND STORAGE MEDIUM

(71) Applicant: Beijing Bytedance Network Technology Co., Ltd., Beijing (CN)

(72) Inventors: Chi Fang, Beijing (CN); Haizhou Zhu, Beijing (CN); Liang Chen, Beijing (CN); Hong Pan, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 380 days.

(21) Appl. No.: 17/638,693

(22) PCT Filed: Aug. 14, 2020

(86) PCT No.: PCT/CN2020/109353
§ 371 (c)(1),
(2) Date: Feb. 25, 2022

(87) PCT Pub. No.: WO2021/082637
PCT Pub. Date: May 6, 2021

(65) Prior Publication Data
US 2022/0406311 A1 Dec. 22, 2022

(30) Foreign Application Priority Data
Oct. 31, 2019 (CN) .......................... 201911053962.2

(51) Int. Cl.
*G06F 3/00* (2006.01)
*G06F 3/03* (2006.01)
(Continued)

(52) U.S. Cl.
CPC ............ *G10L 15/26* (2013.01); *G06F 3/0482* (2013.01); *G06F 3/167* (2013.01); *G06F 40/166* (2020.01);
(Continued)

(58) Field of Classification Search
USPC ..... 381/56–67, 312, 110–123; 382/153–180; 704/1–275; 706/1–62, 900–903
See application file for complete search history.

(56) References Cited

U.S. PATENT DOCUMENTS

| 9,666,208 B1 * | 5/2017 | Rubin .................... G10L 21/12 |
| 2012/0044137 A1 * | 2/2012 | Oddiraju ................ G09G 5/395 |
| | | 345/530 |

(Continued)

FOREIGN PATENT DOCUMENTS

| CN | 101605171 A | 12/2009 |
| CN | 104536717 A | 4/2015 |

(Continued)

OTHER PUBLICATIONS

Yang Lawrence ; Message User Interfaces for Capture and Transmittal of Media and Location Content (Year: 2015).*

(Continued)

*Primary Examiner* — Marcellus J Augustin
(74) *Attorney, Agent, or Firm* — Astute IP Law Group

(57) ABSTRACT

The present disclosure relates to an audio information processing method, an apparatus, an electronic device and a computer-readable storage medium. The audio information processing method includes: determining whether an audio recording start condition is satisfied; collecting audio information associated with an electronic device in response to determining that the audio recording start condition is satisfied; performing word segmentation on text information corresponding to the audio information to obtain word- (Continued)

segmented text information; and displaying the word-segmented text information on a user interface of the electronic device.

24 Claims, 7 Drawing Sheets

(51) Int. Cl.
| | |
|---|---|
| *G06F 3/0482* | (2013.01) |
| *G06F 3/0484* | (2022.01) |
| *G06F 3/16* | (2006.01) |
| *G06F 40/00* | (2020.01) |
| *G06F 40/10* | (2020.01) |
| *G06F 40/166* | (2020.01) |
| *G06F 40/263* | (2020.01) |
| *G06F 40/279* | (2020.01) |
| *G06F 40/284* | (2020.01) |
| *G10L 15/22* | (2006.01) |
| *G10L 15/26* | (2006.01) |
| *G10L 21/14* | (2013.01) |

(52) U.S. Cl.
CPC .......... *G06F 40/263* (2020.01); *G06F 40/279* (2020.01); *G10L 15/22* (2013.01); *G10L 21/14* (2013.01)

(56) References Cited

U.S. PATENT DOCUMENTS

| | | | | |
|---|---|---|---|---|
| 2014/0327831 | A1* | 11/2014 | Liu | G06F 3/03 |
| | | | | 348/659 |
| 2018/0098031 | A1* | 4/2018 | Daniels | H04N 5/77 |
| 2019/0166403 | A1* | 5/2019 | Yelton | H04N 21/8405 |
| 2022/0328823 | A1* | 10/2022 | Choi | H01M 4/5825 |

FOREIGN PATENT DOCUMENTS

| | | |
|---|---|---|
| CN | 107301866 A | 10/2017 |
| CN | 107526634 A | 12/2017 |
| CN | 107608957 A | 1/2018 |
| CN | 107608975 A | 1/2018 |
| CN | 107704447 A | 2/2018 |
| CN | 108052578 A | 5/2018 |
| CN | 109215660 A | 1/2019 |
| CN | 109492227 A | 3/2019 |
| CN | 110767234 A | 2/2020 |
| TW | I582756 B | 5/2017 |
| WO | 0126091 A1 | 4/2001 |
| WO | 2014030258 A1 | 2/2014 |

OTHER PUBLICATIONS

Xu, Fei; Voice Input Method, Device, Computer Device And Storage Medium; 2019 (Year: 2019).*
Zhou, Cheng-li; Text-modifying Method Based On Voice Information, Device And Device Thereof; 2018 (Year: 2018).*
Text-modifying Method Based On Voice Information, Device And Device Thereof (Year: 2018).*
Voice Input Method, Device, Computer Device And Storage Medium (Year: 2019).*
Message User Interfaces for Capture and Transmittal of Media and Location Content (Year: 2015).*
Fang, Chi; An Audio Information Processing Method, Device, Electronic Apparatus And Storage Medium; 2020 (Year: 2020).*
Guang, Ma., "CUBASE Basic Tutorial," Hebei People's Publishing House, Nov. 2017, pp. 68-79. (English translation of abstract).
Office Action in CN201911053962.2, mailed Sep. 27, 2021, 11 pages.
Office Action in CN201911053962.2, mailed Mar. 21, 2022, 7 pages.
Ping et al., "Network Office Automation Technology and Application," Xi'an University of Electronic Science and Technology Press, Jul. 2004, pp. 23-27. (English translation of abstract).
International Search Report and Written Opinion for PCT/CN2020/109353, mailed Nov. 20, 2020, 18 pages.

* cited by examiner

AUDIO INFORMATION PROCESSING METHOD, APPARATUS, ELECTRONIC DEVICE AND STORAGE MEDIUM

This application is a 35 U.S.C. § 371 National Phase of PCT Application No. PCT/CN2020/109353, filed Aug. 14, 2020, which claims priority to Chinese Application No. 201911053962.2, filed Oct. 31, 2019, the disclosures of which are hereby incorporated by reference herein in their entireties.

TECHNICAL FIELD

This disclosure relates to the technical field of audio processing, in particular to an audio information processing method, an apparatus, an electronic device and a storage medium.

BACKGROUND

In related technologies, users can use electronic devices to collect audio information. In some cases, users may want to convert collected audio information into other types of information (for example, text messages). For example, in case that a user is a hearing-impaired person, the user may rely on text messages displayed on a user interface of an electronic device even more. Alternatively, when a user is in a noisy environment, the user may not be able to hear voices. In this case, the user may prefer text messages displayed on a user interface of an electronic device.

Methods described in this part are not necessarily those that have been previously envisaged or adopted. Unless otherwise specified, it shall not be assumed that any method described in this part is considered as prior art only because it is included in this part. Similarly, unless otherwise specified, the problems mentioned in this part shall not be considered to have been recognized in any prior art.

SUMMARY

According to a first aspect of the present disclosure, there is provided an audio information processing method, comprising: determining whether an audio recording start condition is satisfied; collecting audio information associated with an electronic device in response to determining that the audio recording start condition is satisfied; performing word segmentation on text information corresponding to the audio information to obtain word-segmented text information; and displaying the word-segmented text information on a user interface of the electronic device.

According to a second aspect of the present disclosure, there is provided an audio information processing method, comprising: determining whether an audio recording start condition is satisfied; collecting audio information associated with an electronic device in response to determining that the audio recording start condition is satisfied; recognizing text information corresponding to the audio information in real time during the collection of the audio information associated with the electronic device; and displaying the real-time recognized text information on a user interface of the electronic device.

According to a third aspect of the present disclosure, there is provided an audio information processing apparatus, comprising: a determination unit configured to determine whether an audio recording start condition is satisfied; a collection unit configured to collect audio information associated with an electronic device in response to determining that the audio recording start condition is satisfied; a word segmentation unit configured to perform word segmentation on text information corresponding to the audio information to obtain word-segmented text information; and a display unit configured to display the word-segmented text information on a user interface of the electronic device.

According to a fourth aspect of the present disclosure, there is provided an electronic device comprising: a processor; and a memory storing a program, the program comprising instructions that, when executed by the processor, cause the processor to execute the audio information processing method described in the present disclosure.

According to a fifth aspect of the present disclosure, there is provided a non-transitory computer-readable storage medium for storing a program, the program comprising instructions that, when executed by a processor of an electronic device, cause the electronic device to execute the audio information processing method described in the present disclosure.

According to a sixth aspect of the present disclosure, there is provided a computer program product including a program, the program comprising codes that, when executed by a processor of an electronic device, cause the electronic device to execute the audio information processing method described in the present disclosure.

BRIEF DESCRIPTION OF THE DRAWINGS

The accompanying drawings exemplarily show some embodiments and constitute part of the description, and together with the text of the description serve to explain exemplary embodiments of the present disclosure. The illustrated embodiments are for illustrative purposes only, and are not intended to limit the scope of the claims. In all the drawings, the same reference numeral refers to similar but not necessarily the same element.

DETAILED DESCRIPTION

Figure 1:
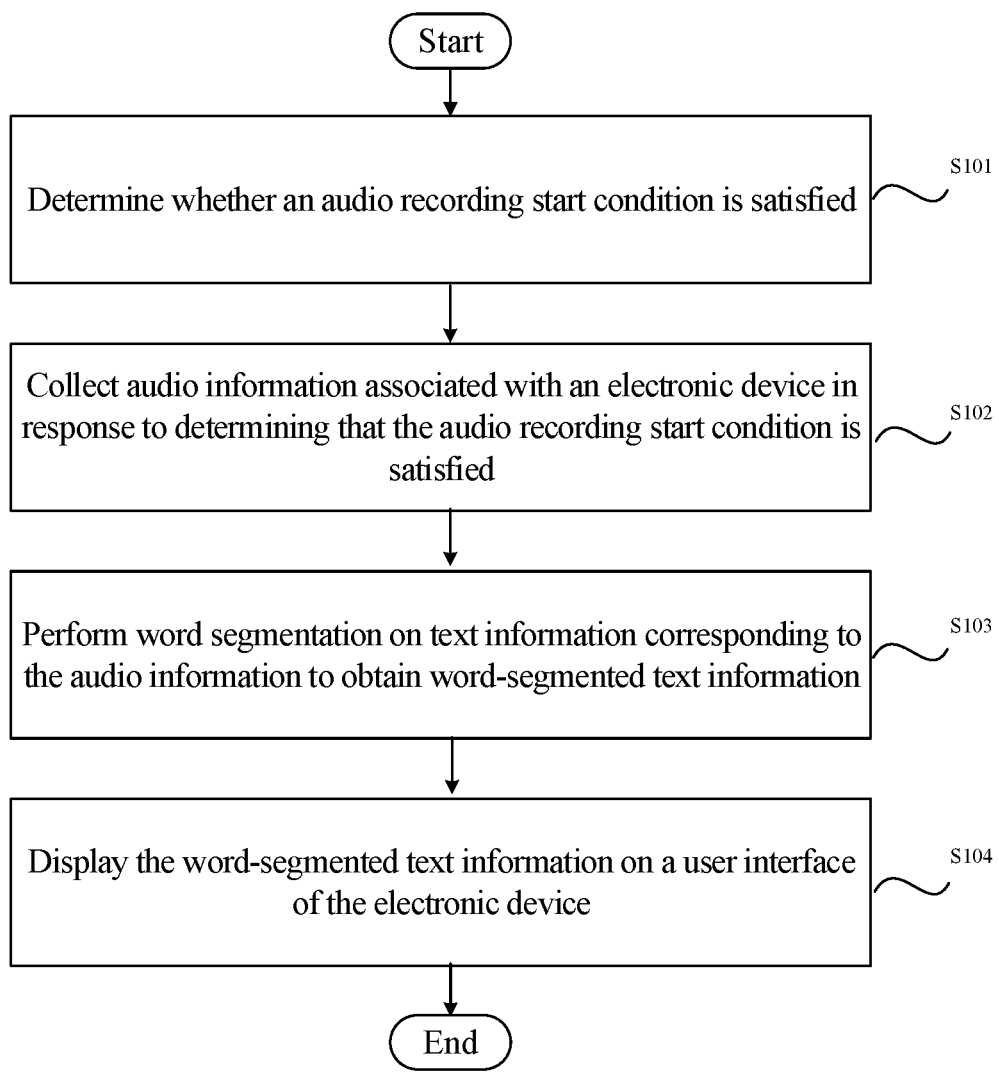
FIG. 1 is a flowchart showing an audio information processing method according to exemplary embodiments of the present disclosure.

Exemplary embodiments of the present disclosure will now be described in detail with reference to the accompanying drawings. Although some embodiments of the present disclosure are shown in the drawings, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may include additional steps and/or some of the illustrated steps may be omitted. The scope of this disclosure is not limited in this regard.

The term "including" and its variants as used herein is an open-ended mode expression, that is, "including but not limited to". The term "based on" means "based at least in part on". The term "one embodiment" means "at least one embodiment"; the term "another embodiment" means "at least one additional embodiment"; the term "some embodiments" means "at least some embodiments". Related definitions of other terms will be given in the following description.

It should be noted that in the present disclosure, unless otherwise specified, the terms "first", "second" and the like are used to describe various elements. These terms are not intended to limit the positional relationship, temporal relationship or importance relationship of these elements, but are only used to distinguish one element from another. In some examples, a first element and a second element may refer to the same instance of the element, and in some cases, they can refer to different instances based on the context of the description.

In addition, the terms used in the description of various examples in the present disclosure are only for the purpose of describing specific examples, but are not intended to be limiting. Unless otherwise expressly stated in the context, if the number of elements is not specifically specified, there may be one or more of the elements. In addition, the term "and/or" as used in the present disclosure covers any and all possible combinations of the listed items.

Further, it should be noted that the titles of messages or information exchanged between multiple devices in the embodiments of the present disclosure are only for illustrative purposes, and are not for limiting the scope of these messages or information.

In the present disclosure, an "electronic device" may be any type of electronic device, such as, but not limited to, a mobile terminal such as a mobile phone, a laptop, a digital broadcast receiver, a PDA (personal digital assistant), a PAD (tablet computer), a PMP (portable multimedia player), a vehicle terminal (such as vehicle navigation terminal), or a fixed terminal such as a digital TV, a desktop computer, etc.

In the present disclosure, a "window" is a medium for a program or code to display on a user interface of an electronic device. In particular, an "application" can display on the user interface of the electronic device through an "application window".

In related technologies, users can use electronic devices to collect audio information. In some cases, users may want to convert collected audio information into other types of information (for example, text messages). For example, in case that a user is a hearing-impaired person, the user may rely on text messages displayed on a user interface of an electronic device even more. Alternatively, when a user is in a noisy environment, the user may not be able to hear voices. In this case, the user may prefer text messages displayed on a user interface of an electronic device.

To this end, the present disclosure provides an audio information processing method, which can collect audio information associated with an electronic device and obtain segment text information by performing word segmentation on the text information corresponding to the audio information. The word-segmented text information can be subsequently viewed or edited by the user, which is particularly advantageous if the user is a hearing-impaired person or when the user is in a noisy environment.

Exemplary embodiments of the audio information processing method of the present disclosure will be further described below in conjunction with the accompanying drawings.

FIG. 1 is a flowchart showing an audio information processing method according to some exemplary embodiments of the present disclosure.

Referring to FIG. 1, a first aspect of the present disclosure may include an audio information processing method, comprising: determining whether an audio recording start condition is satisfied (S101); collecting audio information associated with an electronic device in response to determining that the audio recording start condition is satisfied (S102); performing word segmentation on text information corresponding to the audio information to obtain word-segmented text information (S103); and displaying the word-segmented text information on a user interface of the electronic device (S104).

In step S101, according to some embodiments, it may be determined by the electronic device whether the audio recording start condition is satisfied. According to some embodiments, the audio recording start condition may be a user input through a user interface of the electronic device to start audio recording. According to some embodiments, the audio recording start condition may be a user input through a physical button of the electronic device to start audio recording. According to some embodiments, the audio recording start condition may be independent of a user input.

In step S102, according to some embodiments, the audio information associated with the electronic device may include audio information from the exterior of the electronic device and audio information from the interior of the electronic device.

Herein, collecting audio information associated with the electronic device can be referred to as "audio recording".

According to some embodiments, audio information from the exterior of the electronic device refers to audio information that can be collected by an audio input device (for example, a microphone, etc.) of the electronic device. For example, the audio information from the exterior of the electronic device can include ambient audio information around the electronic device and audio information (e.g., program audio information, voice audio information, etc.) outputted by an audio output device of the electronic device (e.g., a sound device, speaker, earpiece, etc.).

According to some embodiments, the audio information from the interior of the electronic device refers to audio information that can be collected directly from the system of the electronic device.

According to some embodiments, the audio information may include non-speech information and speech information corresponding to text information, and the text information is referred to as text information corresponding to the audio information.

In step S103, according to some embodiments, performing word segmentation on text information refers to the division of the text information based on some word segmentation rules. According to some embodiments, performing word segmentation on text information corresponding to the audio information may include: performing word segmentation on the text information based on at least one of: word segmentation with characters or letters as units, word segmentation with words as units, word segmentation with phrases as units, word segmentation with clauses as units, word segmentation with sentences as units, word segmentation with punctuations as units, or a combination thereof.

According to some embodiments, the word-segmented text information may be characters, letters, words, phrases, clauses, sentences, punctuations, or combinations thereof, depending on the word segmentation rule on which the word segmentation is based. For example, as shown in FIG. 4B, the word-segmented text information obtained after word segmentation of a Chinese poem "松下问童了，言师采药去。o" ("Beneath the pine, I asked the boy, the boy said that his master had gone for gathering herbs.") may be "松", "下", "问童了", "", "言师", "采药去" and "o" ("Beneath the pine", "I asked the boy", "", "the boy said that his master", "had gone for gathering herbs" and ".").

According to some embodiments, the word segmentation rules may be system default rules. According to some embodiments, the word segmentation rules may be adjusted according to a user setting. Different segmented text information can be obtained by performing word segmentation on the same text information based on different word segmentation rules. For example, the word-segmented text information obtained after word segmentation of the Chinese poem "松下问童了，言师采药去。" ("Beneath the pine, I asked the boy, the boy said that his master had gone for gathering herbs.") may be "松", "下", "问", "童", "子", "", "言", "师", "采", "药", "去", and "o" ("beneath", "the pine", "I asked", "the", "boy", "", "the boy said that", "his master", "had gone for", "gathering", "herbs" and "."). As another example, the word-segmented text information obtained after word segmentation of "松下问童了，言师采药去。" ("Beneath the pine, I asked the boy, the boy said that his master had gone for gathering herbs.") may be "松下问童了", "", "言师采药去" and "o" ("Beneath the pine, I asked the boy", "", "the boy said that his master had gone for gathering herbs" and ".").

Figure 4A:
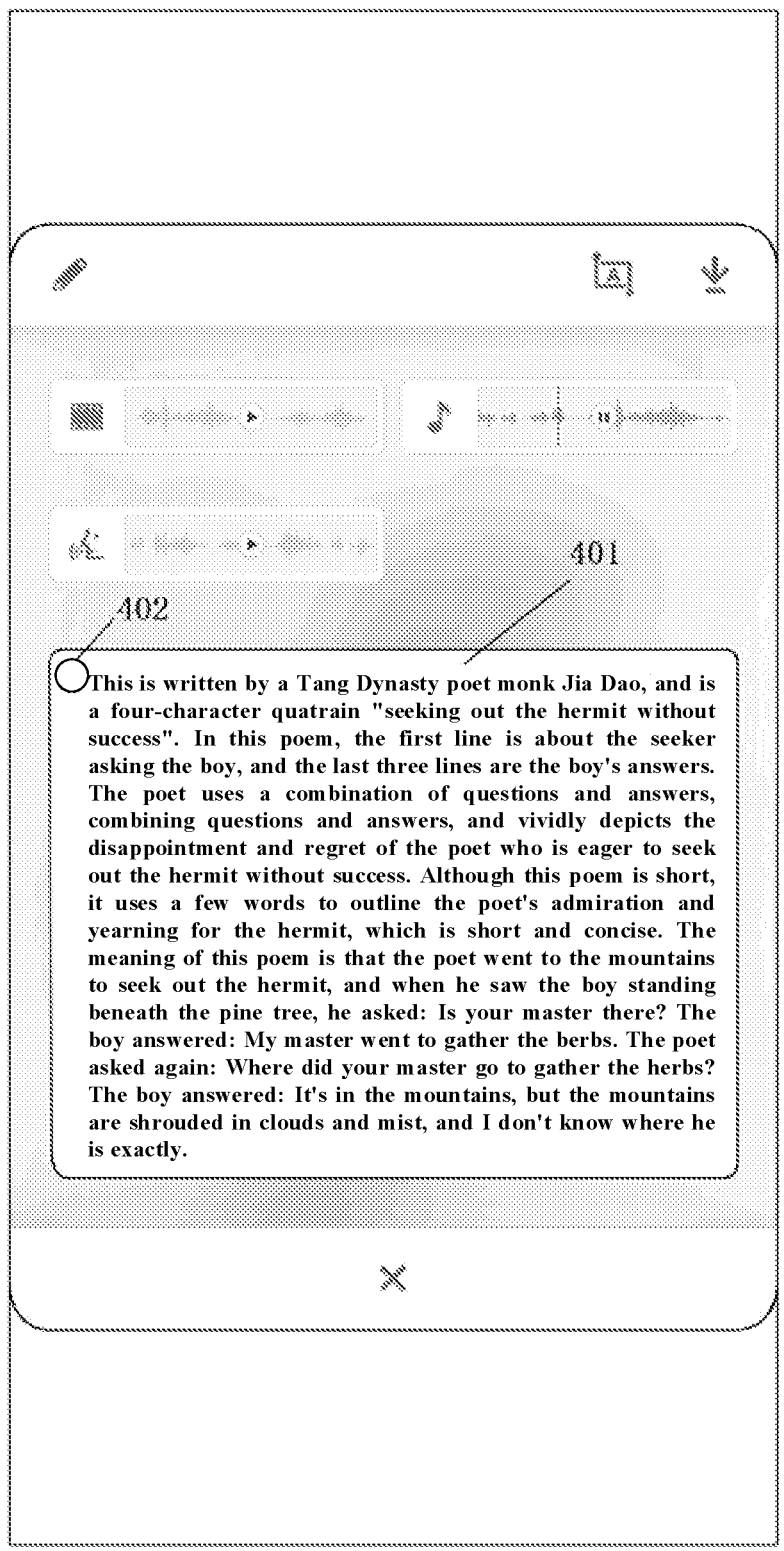
FIG. 4A is a schematic diagram showing a user interface displaying a word segmentation area on a user interface of the electronic device according to exemplary embodiments of the present disclosure.
Figure 4B:
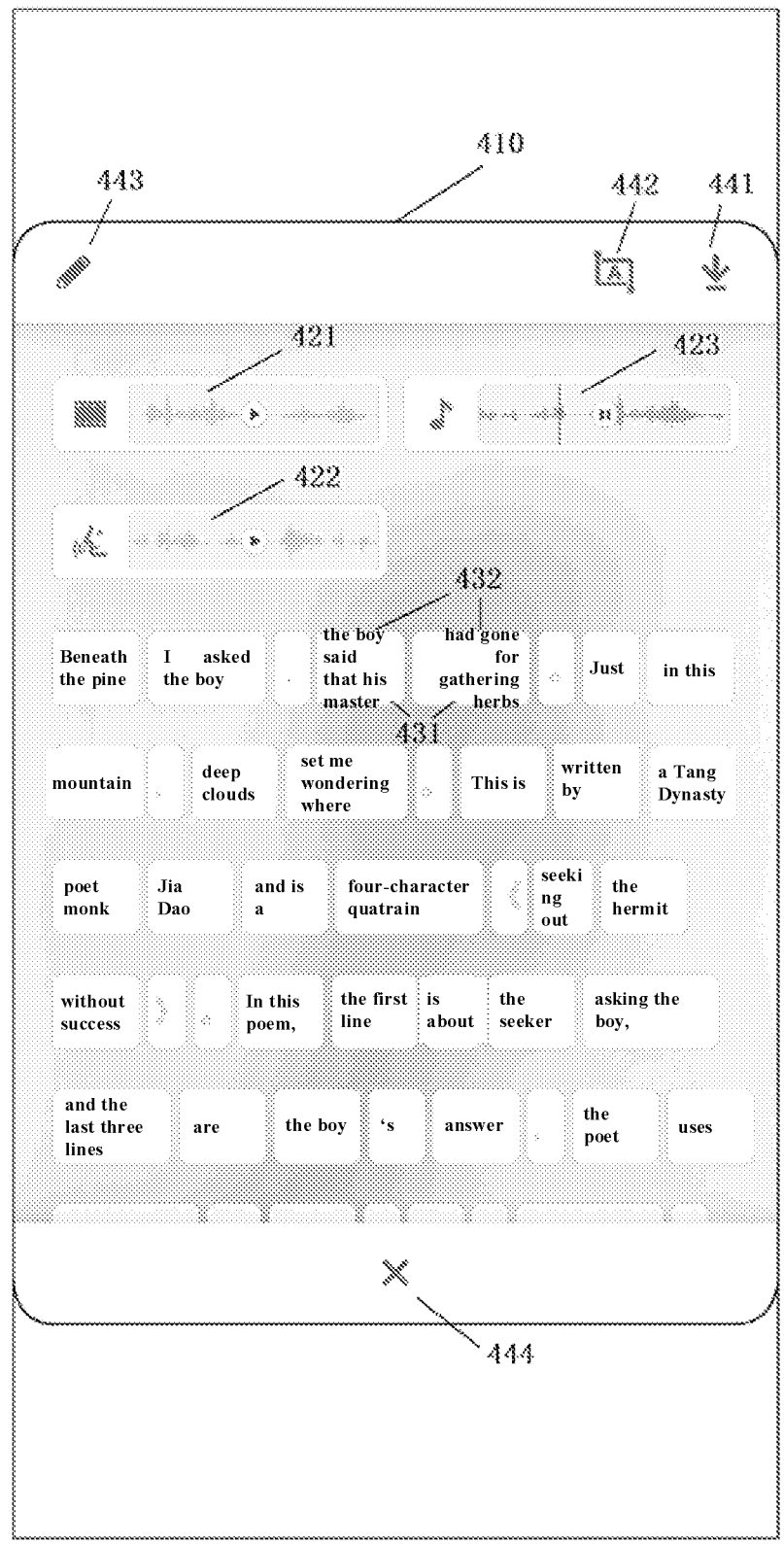
FIG. 4B is a schematic diagram showing a user interface for displaying word-segmented text information on a user interface of the electronic device according to exemplary embodiments of the present disclosure.

In step S104, according to some embodiments, referring to FIG. 4B, the word-segmented text information can be displayed directly on a user interface 400B of the electronic device. According to some embodiments, a word segmentation card 410 can be directly displayed on the user interface of the electronic device, and the word-segmented text information can be displayed on the word segmentation card 410.

According to some embodiments, the user interface of the electronic device may be a touch sensitive user interface.

How to determine whether an audio recording start condition is satisfied will be described below.

According to some embodiments, determining whether an audio recording start condition is satisfied includes: determining that the audio recording start condition is satisfied in response to receiving an input indicating audio processing on the user interface of the electronic device.

According to some embodiments, input indicating audio processing may include a click input, a press input, a slide input, a lift input, or a combination thereof. According to some embodiments, the input indicating audio processing may include one input, such as a click input on an audio word segmentation button, or a press input at a certain location of the user interface, etc. According to other embodiments, the input indicating audio processing may include a plurality of inputs. An input indicating audio processing that includes a plurality of inputs will be described in detail later.

In some cases, a state of the user interface of the electronic device can be determined when receiving the input indicating audio processing.

According to some embodiments, the method may further include: receiving the input indicating audio processing on the user interface of the electronic device, wherein the determining whether an audio recording start condition is satisfied includes: determining whether the user interface of the electronic device is displaying an application window when receiving the input indicating audio processing; determining whether audio recording is allowable for the application window in response to determining that the user interface of the electronic device is displaying an application window when receiving the input indicating audio processing; and determining that the audio recording start condition is satisfied in response to determining that audio recording is allowable for the application window.

According to some embodiments, the user interface of the electronic device may be displaying an application window, a system desktop, a task manager window, etc. when receiving the input indicating audio processing.

It can further determine whether audio recording is allowable for the application window if the user interface of the electronic device is displaying an application window when receiving the input indicating audio processing.

In some cases, audio recording is allowable for the application window. In these cases, it can be determined that the audio recording start condition is satisfied if the user interface of the electronic device is displaying the application window when receiving the input indicating audio processing.

In other cases, audio recording is not allowed for the application window. According to some embodiments, the developer of the application window may not allow audio recording for the application window (for example, for copyright or privacy reasons). According to some embodiments, a user may set the application window to be audio recording disallowed. The user may set the application window to be audio recording disallowed since the user does not want to be disturbed when operating on the application window. For example, the application window that can be set by the user to be audio recording disallowed may be a game application window. Therefore, it can be determined that the audio recording start condition is not satisfied if the user interface is displaying an application window that is audio recording disallowed when receiving the input indicating audio processing.

In this way, it can be further determined whether audio recording is allowed for the application window depending on whether the user interface is displaying an application window when receiving the input indicating audio processing. For an application window that is audio recording disallowed, if an input indicating audio processing is received on the application window (for example, in the event of a misoperation of the user, or if the indication of audio processing is inputted in the same way as another operation input in the displayed application window), the electronic device will not start audio recording in response to the input indicating audio processing, which can make the response to the input indicating audio processing more accurate, thereby improving the user experience.

According to some embodiments, determining whether an audio recording start condition is satisfied further includes: determining that the audio recording start condition is satisfied in response to determining that the user interface of the electronic device is not displaying an application window when receiving the input indicating audio processing.

According to some embodiments, instead of an application window, the user interface of the electronic device may be displaying other window such as a desktop window, a task manager window, etc. when receiving the input indicating audio processing. In these cases, since there is no worry about disturbing the user, the electronic device can directly determine that the audio recording start condition is satisfied, and then start audio recording, thereby simplifying the step of determining whether the audio recording start condition is satisfied.

As described above, the input indicating audio processing may comprise a single input or a plurality of inputs.

According to some embodiments, receiving an input indicating audio processing on the user interface of the electronic device may include: receiving an input for showing a function menu on the user interface of the electronic device; displaying a function selection menu on the user interface of the electronic device in response to receiving the input for showing a function menu, wherein the function selection menu includes an audio word segmentation option; and receiving a selection for the audio word segmentation option.

Figure 2:
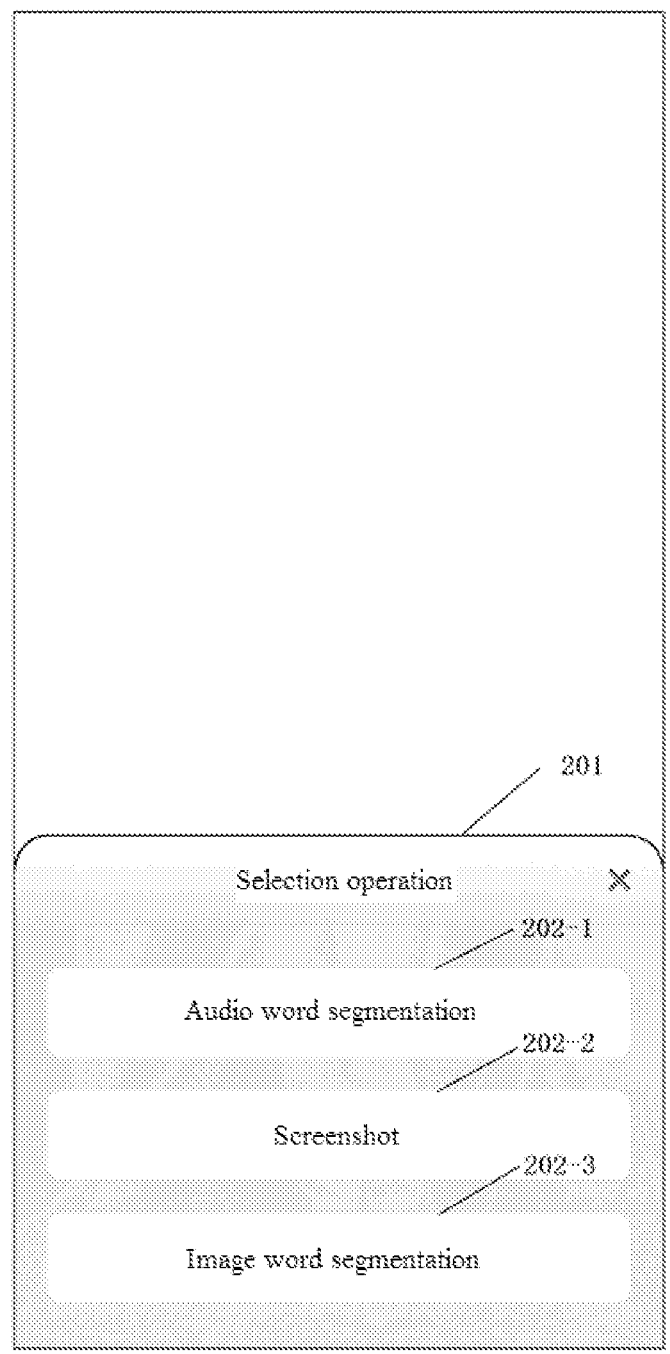
FIG. 2 is a schematic diagram showing an example of a user interface for determining whether an audio recording start condition is satisfied according to exemplary embodiments of the present disclosure.

FIG. 2 is a schematic diagram showing an example of a user interface 200 for determining whether an audio recording start condition is satisfied according to some exemplary embodiments of the present disclosure. How to determine an audio recording start condition by a function selection menu and selecting a function option from the function selection menu will be described below with reference to FIG. 2.

According to some embodiments, the input indicating audio processing may include two inputs. A first input of the input indicating audio processing includes an input for showing a function menu on the user interface of the electronic device. Referring to FIG. 2, a function selection menu 201 is displayed on the user interface of the electronic device in response to receiving the input for showing a function menu (for example, a click input on a button for showing a function menu, a press input on the user interface, a slide input upward from the lower edge of the user interface of the electronic device, etc.). According to some embodiments, the function selection menu 201 may include a plurality of function options. According to the example shown in FIG. 2, the function selection menu 201 may include three function options, namely, audio word segmentation option 202-1, screenshot option 202-2, and image word segmentation option 202-3. Certainly, the present disclosure is not limited to this, and the function selection menu may include any number of function options. The user can select a function option from the function menu 201. According to some embodiments, as a second input of the input indicating audio processing, the input indicating audio processing further includes a selection for the audio word segmentation option 202-1.

In this way, two inputs can be used to determine whether an audio recording start condition is satisfied, which may provide the user with more opportunities for determination and longer time for consideration, and can prevent the user from unintentionally starting audio recording due to misoperation.

According to some embodiments, the audio information processing method may further comprise: receiving an input indicating audio processing on the user interface of the electronic device, wherein the determining whether an audio recording start condition is satisfied may include: obtaining a location of the input indicating audio processing on the user interface of the electronic device; determining whether the location on the user interface of the electronic device belongs to a text extractable area; and determining that the audio recording start condition is satisfied in response to determining that the location on the user interface of the electronic device does not belong to a text-extractable area.

According to some embodiments, the user interface of the electronic device may include a text-extractable area and a non-text-extractable area. The text-extractable area refers to an area where text can be selected in response to a text extraction input, for example, an area where text sessions are located in a chat application, or an area where a body of text is located in a mailbox application, etc. The non-text-extractable area refers to an area where text cannot be selected in response to a text extraction input, such as an area where pictures are located on the system desktop or in an album application. The text extraction input may include a click input, a press input, a slide input, lift input, or a combination thereof on a text-extractable area. It can be seen that the text extraction input may overlap with the input indicating audio processing.

According to some embodiments, it is determined that the audio recording start condition is satisfied, and then audio recording is started if the location of the input indicating audio processing on the user interface of the electronic device does not belong to a text-extractable area. In this way, the audio recording start condition can be determined more accurately without interfering with the text extraction input, and thereby user experience can be improved.

According to some embodiments, as described above, in the case where the input indicating audio processing may include a plurality of inputs (i.e., an input for showing a function menu and an input for selecting an audio word segmentation option), the obtaining a location of the input indicating audio processing on the user interface of the electronic device may include: obtaining a location of the input for showing a function menu on the user interface of the electronic device. According to some embodiments, it is determined that a function selection menu can be displayed in response to determining that the location of an input for showing a function menu that is a first input of the input indicating audio processing does not belong to a text-extractable area. Then, an audio word segmentation option is selected from the function selection menu as a second input of the input indicating audio processing.

In this way, in order to satisfy the audio recording start condition, through excluding an input in the text-extractable area by an input for showing a function menu that is the first input as the input indicating audio processing, and confirming that the user wants to start audio recording by an audio word segmentation option that is the second input of the input indicating audio processing, the accuracy of the determination of whether the audio recording start condition is satisfied can be further increased, and thereby user experience can be improved.

According to some embodiments, collecting audio information associated with the electronic device may include collecting audio information from the exterior of the electronic device in real time and/or collecting audio information from the interior of the electronic device. According to some embodiments, the real-time collection of audio information from the exterior of the electronic device and/or the real-time collection of audio information from the interior of the electronic device may be automatically performed.

According to some embodiments, in some cases, the audio information may come from either outside or inside the electronic device. In these cases, it is preferable to collect audio information from the interior of the electronic device. Taking voice audio information as an example, during a call with other person, on the one hand, voice audio information from the other person can be output to the outside of the electronic device through an earpiece and collected through a microphone. On the other hand, voice audio information from the other person can be collected directly from the system of electronic device. During the procedure of outputting voice to the outside of the electronic device through the earpiece and collecting it through a microphone, ambient audio information around the electronic device may be collected at the same time, and may form noises of the voice audio information. Therefore, it is preferable to collect voice audio information from the system of the electronic device.

According to some embodiments, the real-time collection of audio information from the interior of the electronic device includes: creating an underlying hardware path; and collecting audio information from an underlying hardware as audio information from the interior of the electronic device in real time through the underlying hardware path in response to determining that the audio recording start condition is satisfied.

According to some embodiments, the audio information from the interior of the electronic device may include audio information from an underlying hardware. The audio information from the underlying hardware can be obtained from the electronic device (e.g., its system) without being output externally. Therefore, when collecting audio information from the underlying hardware, there is no interference from ambient audio information around the electronic device (e.g., noises, etc.).

According to some embodiments, in order to enable the electronic device to acquire audio information from underlying hardware in response to determining that the audio recording start condition is satisfied, the underlying hardware path may be created. The underlying hardware path can be used to transmit audio information from underlying hardware.

According to some embodiments, the audio information processing method may further include: creating a hardware abstraction layer, wherein the hardware abstraction layer is adapted to configure the underlying hardware path to provide an interface for audio information collected from underlying hardware; and creating a virtual audio information input device configured to invoke the hardware abstraction layer when it is determined that the audio recording start condition is satisfied to collect audio information from underlying hardware in real time through the underlying hardware path configured by the hardware abstraction layer to provide an interface for audio information from underlying hardware.

According to some embodiments, taking the Android system as an example, a hardware abstraction layer (HAL) can be created for the electronic device. The hardware abstraction layer is used to configure an underlying hardware path, so as to provide an interface for audio information from Android compliant underlying hardware. Audio information can be obtained from underlying hardware through the interface. According to some embodiments, for example, a new virtual audio information input device can be declared using audioPolicy under the Android audio native framework to invoke the hardware abstraction layer when it is determined that the audio recording start condition is satisfied. According to some embodiments, a virtual audio information source can be defined to obtain audio information from the underlying hardware using audioRecord that is an Android native class. According to some embodiments, in response to determining that the audio recording start condition is satisfied, audioRecord is configured to find a virtual audio information input device using audioPolicy, and invoke the hardware abstraction layer, so as to access the underlying hardware through the hardware abstraction layer to obtain audio information from the underlying hardware.

In this manner, regardless of whether audio information from the interior of the electronic device is output by an audio output device externally, it can be directly collected from the underlying hardware of the electronic device in real time. Moreover, the audio information will not be interfered by other audio information outside the electronic device.

According to some embodiments, the audio information processing method may further include: recognizing text information corresponding to the audio information in real time during the collection of the audio information associated with the electronic device. As described above, recognizing text information corresponding to the audio information may include recognizing and acquiring text information corresponding to speech information from the audio information. According to some embodiments, the real-time recognition of the text information corresponding to the audio information can be performed automatically after the beginning of audio recording without the need of an instruction given by the user specially for speech recognition for specific audio information.

The real-time recognition and display of the collected audio information will be described below with reference to FIG. 3. FIG. is a schematic diagram showing a user interface 300 for displaying recognized text information in real time during the collection of audio information associated with an electronic device according to some exemplary embodiments of the present disclosure.

According to some embodiments, the audio information processing method may further include: displaying the real-time recognized text information on the user interface of the electronic device in real time. As shown in the example of FIG. 3, real-time recognized text information 301 corresponding to the audio information, that is, text information text information of the Chinese poem "松下问童子, 言师采药去。" ("Beneath the pine, I asked the boy, the boy said that his master had gone for gathering herbs") can be displayed on the user interface of the electronic device 300 in real time.

In this way, during the collection of audio information associated with the electronic device, the user can see text information corresponding to the audio information in real time through the user interface of the electronic device. For example, the user can understand the content of the audio information through the text information displayed in real time if the electronic device is in a noisy external environment and it is difficult to hear the content of the audio information.

According to some embodiments, the real-time recognized text information can be displayed through a variety of display methods. According to some embodiments, the real-time recognized text information can be displayed on the user interface of the electronic device.

According to some embodiments, the real-time recognized text information can be arranged horizontally on the user interface, for example, arranged in units of lines. According to other embodiments, the real-time recognized text information can also be arranged vertically on the user interface, for example, arranged in units of columns. Certainly, the present disclosure is not limited to this, and the real-time recognized text information can also be displayed in any suitable manner, such as arranged in a circular form. For convenience, the display of real-time recognized text information on the user interface will be described in detail below by taking a horizontal arrangement as an example.

According to some embodiments, a line of real-time recognized text information can be displayed on the user interface at a certain time. For example, the line of real-time recognized text information may include a piece of text information recognized in a period from a time before and up to the certain time. According to other embodiments, multiple lines of real-time recognized text information can be displayed on the user interface. For example, the multiple lines of real-time recognized text information may include all text information recognized in a period from the time when it is determined that the audio recording start condition is satisfied to the certain time.

According to some embodiments, it is possible to switch between the display of a portion of text information recognized in a period from a time before and up to the certain time (for example, a line of real-time recognized text information) and the display of all text information recognized in a period from the time when it is determined that the audio recording start condition is satisfied to the certain time (for example, multiple lines of real-time recognized text information). For example, the user interface displays a portion of the recognized text information (for example, recognized in a period from a time before and up to the certain time), and can switch to display all the recognized text information in response to a text display switch input (for example, a click input) on part of the recognized text information. All the recognized text information can be displayed in response to a text display switch input (for example, a click input) on part of the recognized text information. A portion of the recognized text information can be displayed in response to a text display switch input (for example, a click input) on part of the recognized text information again.

According to some embodiments, the number of characters contained in each line of the real-time recognized text information displayed on the user interface may be adjustable. For example, each line can display 5 characters, 6 characters, 8 characters, 10 characters, etc. According to some embodiments, the number of characters contained in each line of the real-time recognized text information displayed on the user interface can be adapted to the resolution of the user interface. According to some examples, the higher the resolution of the user interface, the more characters can be contained in each line of the real-time recognized text information; on the contrary, the lower the resolution of the user interface, the fewer characters can be contained in each line of the real-time recognized text information.

According to some embodiments, the font size can be adjusted for each line of the real-time recognized text information displayed on the user interface. For example, the font size can be sizes 3, 4, 5, etc. According to some embodiments, the font size of each line of the real-time recognized text information displayed on the user interface can be adapted to the resolution of the user interface. According to some examples, the higher the resolution of the user interface, the larger the font size of each line of the real-time recognized text information; on the contrary, the smaller the resolution of the user interface, the smaller the font size of each line of the real-time recognized text information.

According to some embodiments, the real-time recognized text information can be displayed in a View Control displayed on the user interface. According to some embodiments, the size of the View Control displaying the real-time recognized text information may be associated with the number of lines and font of the real-time recognized text information.

According to some embodiments, the size of the View Control for displaying real-time recognized text information may be adjustable. According to some examples, the size of the View Control can be adjusted according to a user input (for example, dragging an edge or vertex of the View Control, or entering a size of the View Control as a setting). According to some embodiments, the size of the View Control can be determined according to a system default setting.

At some point, in case that a limited portion of the real-time recognized text information is displayed on the user interface (for example, only a line of the real-time recognized text information is displayed on the user interface), according to some embodiments, upon the display of the line of text information, the line of text information that has been displayed may not be displayed any longer; and thereafter, text information subsequently recognized in real time can be displayed in the line. According to other embodiments, upon the display of a line of text information, when a new character is recognized, the earliest recognized character in the line may no longer be displayed. Instead, other remaining characters can move forward sequentially to fill a space caused by the earliest recognized character that is disappeared, with a newly recognized character filled in the last space. In this way, the real-time recognized text information can be updated and displayed in a scrolling manner along a certain direction (e.g., through moving left in the horizontal direction).

When the user interface of the electronic device is displaying a video application, according to some embodiments, a location of a video playback area can be determined, and a display location of the real-time recognized text information can be determined based on the location of the video playback area. For example, in the case of non full screen display, the display location of the real-time recognized text information can be located outside the video playback area so as not to block the video playback area. For example, in the case of full screen display, the display location of the real-time recognized text information can be located at an edge (e. g., at the lower edge) of the video playback area to minimize the occlusion of the video playback area.

According to some embodiments, the color of real-time recognized text information may be a default setting (e.g., white). According to some embodiments, the color of the real-time recognized text information may be determined based on the color of the user interface at the location where the text information is to be displayed. According to some examples, the color of the real-time recognized text information may be determined based on the color and contrast of the location where the text information is to be displayed to ensure that the real-time recognized text information can be easily seen by the user. For example, the color of the real-time recognized text information can be black if the color of the location where the text information to be displayed in the user interface is white.

Figure 3:
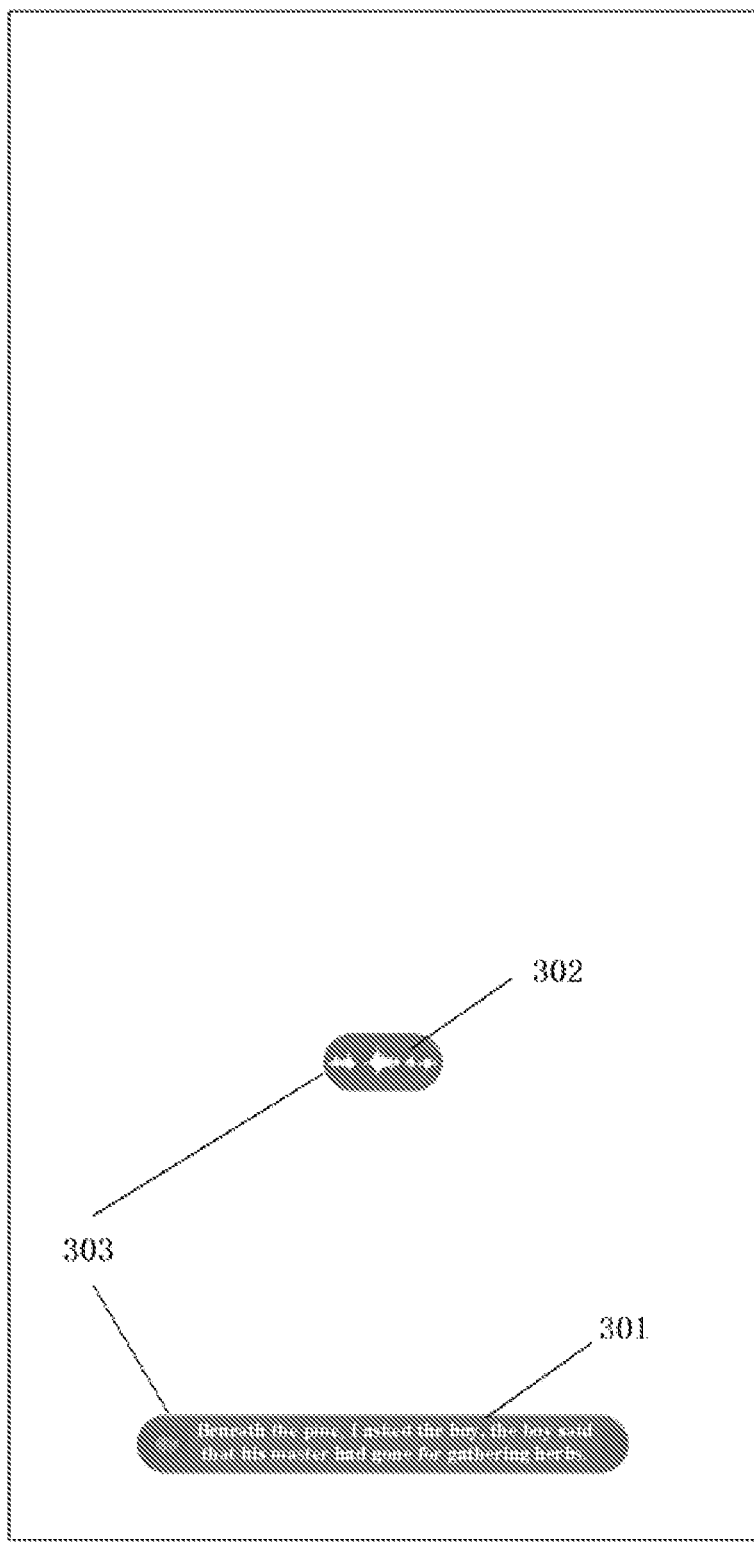
FIG. 3 is a schematic diagram showing a user interface for displaying recognized text information in real time during the collection of audio information associated with an electronic device according to exemplary embodiments of the present disclosure.

According to some embodiments and referring to FIG. 3, the audio information processing method may further include: displaying a waveform 302 associated with the audio information on the user interface 300 of the electronic device in real time during the collection of the audio information associated with the electronic device.

According to some embodiments, the waveform 302 associated with the audio information may change in real time. According to some embodiments, the real-time change of the waveform may be associated with the real-time audio and the real-time amplitude of the audio information.

In this way, an animation effect is provided in the collection of the audio information associated with the electronic device, which can improve the vividity of the collection of the audio information associated with the electronic device, and thereby improving the user's visual experience.

According to some embodiments, the real-time recognized text information 301 and the waveform 302 associated with the audio information may be displayed simultaneously on the user interface of the electronic device. According to other embodiments, the real-time recognized text information 301 and the waveform 302 associated with the audio information may be alternatively displayed on the user interface of the electronic device.

According to some embodiments, the method may further include: receiving a first switch input for the waveform associated with the audio information; displaying the real-time recognized text information on the user interface of the electronic device in response to the first switch input; receiving a second switch input for the real-time recognized text information; and displaying a waveform associated with the audio information on the user interface of the electronic device in response to the second switch input.

According to some embodiments, one of the real-time recognized text information and the waveform associated with the audio information can be directly displayed on the user interface. And in response to the first switch input or the second switch input, one of the real-time recognized text information and the waveform associated with the audio information can be displayed alternatively.

According to other embodiments, a View Control may be displayed on the user interface, and the real-time recognized text information and/or the waveform associated with the audio information may be displayed in the View Control. According to some embodiments, an audio recording View Control 303 may be displayed on the user interface of the electronic device. According to some embodiments, the real-time recognized text information 301 and the waveform 302 associated with the audio information may be displayed in the audio recording View Control 303. According to some embodiments, the real-time recognized text information 301 and/or the waveform 302 associated with the audio information displayed in the audio recording View Control 303 can move with the movement of the audio recording View Control 303.

In this way, the user can adjust the display location of the real-time recognized text information and the waveform associated with the audio information at any time, so that the user has greater freedom of operation, which can improve the user experience.

According to some embodiments, the display of the real-time recognized text information 301 and the display of the waveform 302 associated with the audio information can be switched in the audio recording View Control 303. For example, the real-time recognized text information 301 may be displayed in the audio recording View Control 303. It can be switched to display the waveform 302 associated with the audio information in the audio recording View Control 303 in response to a switch input on the audio recording View Control. And it can be switched to display the real-time recognized text information 301 in the audio recording VC 303 again in response to another switch input on the audio recording View Control.

In this way, the user can select whether to display the real-time recognized text information or the waveform associated with the audio information on the user interface as needed, resulting in greater freedom of user operation and improved user experience.

As described above, according to some embodiments, in the process of collecting audio information associated with an electronic device, the text information corresponding to the audio information can be recognized in real time. According to other embodiments, text information corresponding to the audio information can be recognized after the collection of the audio information associated with the electronic device.

According to some embodiments, the performing word segmentation on the text information corresponding to the audio information may include: recognizing text information corresponding to the audio information; and performing word segmentation on the recognized text information.

In this way, the process of collecting the audio information can be separated from the process of recognizing the text information corresponding to the audio information, which can reduce the memory occupation, and is very advantageous for some electronic devices with less memory (such as some special electronic devices for the elderly).

According to some embodiments, the recognition of text information corresponding to the audio information may include: extracting speech information and non-speech information from the audio information; and recognizing text information corresponding to the speech information.

According to some embodiments, since the audio information includes the speech information and the non-speech information, in the process of recognizing the audio information, speech information can be extracted first from the audio information, and thereby recognition can be only performed on the speech information to obtain text information corresponding to the speech information. According to some embodiments, a start point and an end point can be determined for each segment of speech information in the audio information using an endpoint detection method of speech. For example, the endpoint detection method can be a double threshold endpoint detection algorithm. The speech information may include, for example, voices of a specific object. The non-speech information may include, for example, background environment sounds that are not human voices, or background human voices other than the voices of the specific object.

According to some embodiments, the recognizing the text information corresponding to the speech information may include: preprocessing the speech information; extracting audio features from preprocessed speech information; performing pattern matching with a reference pattern library to obtain a recognition result based on the extracted audio features.

According to some embodiments, the preprocessing of the speech information may include one or more of sampling quantization, framing, and windowing. According to some examples, the collected speech information is usually continuous and consists of many sine waves with different amplitudes and frequencies. Sampling and quantization of speech information means that speech information represented by analog signals is transformed into speech information represented by digital signals for processing by an electronic device. According to some examples, the speech information is generally unsteady signals, but can be considered as steady signals in a short time period. Therefore, the speech information can be processed by framing to ensure that the speech information after framing is approximately a steady-state signal. According to some examples, framing processing can be realized by a window function, such as a rectangular window function, a Hamming window function, a Haining window function, etc.

According to some embodiments, audio features may include, for example, time domain features, frequency domain features, cepstrum domain features (e.g., Mel cepstrum coefficient (MFCC), linear prediction cepstrum coefficient (LPCC), etc.), and other features suitable as audio features.

According to some embodiments, for example, various models such as Dynamic Time Warping (DTW) model, Vector Quantization (VQ) model, Hidden Markov model (HMM), Artificial Neural Network (ANN) model can be used for training to obtain a reference pattern library.

In this way, the interference of non-speech information can be eliminated in the process of recognizing text information corresponding to the speech information, and the accuracy of recognizing text information corresponding to the audio information can be further improved.

According to some embodiments, the language of the text information corresponding to the audio information may be determined in the process of collecting the audio information associated with the electronic device.

According to other embodiments, the language of the text information corresponding to the audio information may also be determined after the collection of the audio information associated with the electronic device.

According to some embodiments, the word segmentation of the text information corresponding to the audio information may further include: determining the language of the text information; and performing word segmentation on the text information based on the language. According to some embodiments, the determining the language of the text information may include: determining the language of the text information based on a user input for the language, automatically identifying the language of the text information, or a combination thereof. The accuracy of recognizing text information corresponding to the audio information can be further improved by determining the language of the text information.

According to some embodiments, the language of the text information may be determined based on a user input for the language. For example, the user can determine the language (e.g., Chinese, English, etc.) to be used for a call before talking with a friend. In this case, the user can notify the electronic device of the language of the text information corresponding to the audio information to be recognized through a user input for the language (for example, Chinese, English, French, German, etc.). In this way, the electronic device does not need to take some time to determine the language first, which can improve the recognition accuracy (especially, the recognition accuracy in a period of time at the beginning of recognition).

According to some embodiments, the electronic device can automatically identify the language of the text information based on a machine learning algorithm. The automatic identification of the language of text information can reduce the user's operation and improve the user's experience.

According to some embodiments, the language of the text information can be automatically identified based on the speech information in the audio information. According to some examples, automatic identification. For example, the langid toolkit can be used for language identification.

According to some embodiments, the language of the text information obtained after audio information recognition can be automatically identified.

According to some embodiments, the language of the text information may be determined using a starting portion of the speech information in the audio information or the recognized text information. In this way, the language of the text information can be obtained as soon as possible, so as to assist subsequent text information recognition in a way that occupies as little memory as possible. According to some embodiments, the language of the text information can be identified and determined in real time. In this way, in a scenario that may include multiple languages, the language of the text information corresponding to the speech information in different time periods can be determined in a better manner.

In this way, the grammatical composition and phrase order of words contained in the text information can be better determined through language identification, making the recognition of speech information more accurate.

In some cases, the amount of text contained in the text information corresponding to the audio information may be large.

According to some embodiments, performing word segmentation on text information corresponding to the audio information may include: comparing the word number of the text information with a word number threshold; and performing word segmentation on all the text information if the word number of the text information is less than or equal to the word number threshold, and performing word segmentation on a portion of the text information if the word number of the text information is greater than the word number threshold. According to some embodiments, the word number of this portion of the text information is less than or equal to the word number threshold. According to some embodiments, the word number of this portion of the text information may be greater than the word number threshold.

According to some embodiments, the word number threshold may be preset by the user or is a system default value. The system default word number threshold may be associated with the display area of the user interface of the electronic device, the font size of the electronic device, user preferences, etc. According to some examples, the word number threshold may be 10, 20, 50, 100, etc.

According to some embodiments, the portion of the text information for word segmentation may be specified as a system default setting. For example, word segmentation may be performed on a portion of the text information from the beginning of the text information. As another example, word segmentation may be performed on a portion of the text information from the end of the text information. As another example, word segmentation may be performed on a portion of the text information in the middle of the text information.

According to some embodiments, the portion of the text information for word segmentation may also be determined based on a user input. According to some embodiments, a word segmentation area may be determined based on a user input.

A word segmentation area according to some exemplary embodiments of the present disclosure will be described below with reference to FIG. 4A. FIG. 4A is a schematic diagram showing a user interface 400A displaying a word segmentation area on a user interface of the electronic device according to some exemplary embodiments of the present disclosure.

According to some embodiments, text information corresponding to the audio information may be displayed in the word segmentation area 401. According to some embodiments, the word segmentation area 401 may refer to an area where the text information corresponding to the audio information is located. The text information in the word segmentation area 401 has not been segmented. As shown in FIG. 4A, the text information in the word segmentation area 401 is "松下问童子, 言师采药去。○ . . . 具体也不知道在哪儿|○" ("Beneath the pine, I asked the boy, the boy said that his master had gone for gathering herbs. . . . I don't know where he is exactly.").

A user input on the word segmentation area can include a click input on the word segmentation area, a press input on the word segmentation area, a slide input on some text information in the word segmentation area, etc.

According to some embodiments, a portion of the text information associated with the word segmentation area 401 may be determined according to different types of user input on the word segmentation area. For example, a location of the click input on the word segmentation area may be taken as a reference point if the user input on the word segmentation area is a click input 402 on the word segmentation area; a certain amount of text (for example, 50 words) can be selected before and after the reference point based on the reference point; and the selected text (for example, 100 words) can be used as a portion of the text information that is associated with the word segmentation area. For another example, a text portion passed by a slide input on text information in the word segmentation area can be used as a portion of the text information that is associated with the word segmentation area if the user input on the word segmentation area is a slide input on some text information in the word segmentation area. Certainly, the present disclosure is not limited to the above examples, and a portion of the text information that is associated with the word segmentation area can be determined in various ways.

According to some examples, referring to FIG. 4A and FIG. 4B, the text information in the word segmentation area 401 is "松下问童子, 言师采药去. . . 诗人采用问题和回答相结合 . . . 具体也不知道在哪儿。○" ("Beneath the pine, I asked the boy, the boy said that his master had gone for gathering herbs . . . The poet uses a combination of questions and answers . . . I don't know where he is exactly."). In these examples, since the number of words of the text information displayed in the word segmentation area 401 is greater than the word number threshold, a portion of the text information can be selected for word segmentation. As shown in FIG. 4A, the user input 402 on the word segmentation area 401 is a click input, and the user input 402 is located at the beginning of the text information in the word segmentation area 401. Then, the electronic device starts to perform word segmentation on a portion of the text information with the location of the click input as a reference point. For example, as shown in FIG. 4B, only a portion of the text information in the word segmentation area 401, i.e., "松下问, 童子, 言师采药去 . . . 诗人采用" ("Beneath the pine, I asked the boy, the boy said that his master had gone for gathering herbs . . . The poet uses") is subject to word segmentation to obtain the word-segmented text information. The remaining portion other than that specified above in the word segmentation area, i.e., "问题和回答相 结合 . . . 具体也不知道在哪儿。○" ("a combination of questions and answers . . . I don't know where he is exactly.") will not be word-segmented.

In this way, only a portion of the text information can be word-segmented to obtain some word-segmented text information corresponding to this portion of the text information, which can reduce the memory occupation and facilitate the subsequent operation of the user.

According to some embodiments, the performing word segmentation on the text information corresponding to the audio information may further include: determining whether an audio recording stop condition is satisfied; and performing word segmentation on the text information corresponding to the audio information in response to that the audio recording stop condition is satisfied.

According to some embodiments, the electronic device may start the execution of the audio information processing method according to the present disclosure in response to determining that an audio recording stop condition is satisfied.

According to some embodiments, it may be determined by the electronic device whether an audio recording stop condition is satisfied. According to some embodiments, the recording stop condition may be a user input for stopping audio recording on the user interface of the electronic device. According to some embodiments, the audio recording stop condition may be a user input for stopping audio recording on a physical key of the electronic device. According to some embodiments, the audio recording stop condition may be independent of a user input. How to determine whether an audio recording stop condition is satisfied will be described below.

In this way, through setting an audio recording stop condition, the electronic device and/or the user can determine the duration of collecting audio information associated with the electronic device in a better way, and thereby the controllability of the audio information processing method according to the present disclosure can be enhanced.

According to some embodiments, the audio information processing method may further include: acquiring an elapsed time since the start of the collection of audio information associated with the electronic device in real time; and determining that the audio recording stop condition is satisfied if the elapsed time acquired in real time is greater than or equal to a stop time threshold. According to some embodiments, the stop time threshold may be preset by the user or may be a system default value of the electronic device. According to some examples, the stop time threshold may be 20 seconds, 30 seconds, 1 minute, 2 minutes, etc.

In some cases, the stop time threshold can only be set by the developer, and cannot be changed by the user.

According to some embodiments, the audio information processing method may further include: determining whether a preset condition is satisfied; and setting the stop time threshold to infinity in response to determining that the preset condition is satisfied.

According to some embodiments, the preset condition may include the type of account associated with the electronic device, the model of the electronic device, the type of SIM card in the electronic device, and the like.

According to some examples, the preset condition may be the type of account associated with the electronic device. For example, it can be determined that the preset condition is satisfied when it is determined that the type of account associated with the electronic device is a subscriber.

According to some examples, the preset condition can be the model of the electronic device. For example, when it is determined that the electronic device is a mobile phone of a certain brand, it can be determined that the preset condition is satisfied.

According to some examples, the preset condition may be the type of SIM card in the electronic device. For example, when it is determined that the operator of the SIM in the electronic device is operator A, it can be determined that the preset condition is satisfied.

Certainly, the present disclosure is not limited to this, and those skilled in the art should understand that verification in the audio information processing method according to the present disclosure can be performed under any other suitable preset condition.

According to some embodiments, the stop time threshold is set to infinity in response to determining that a preset condition is satisfied. Setting the stop time threshold to infinity may include, for example, setting the stop time threshold to a sufficiently large value. In other words, the stop time threshold is set to a value that is almost impossible to reach when the audio recording word segmentation function is normally used. According to some examples, for example, the value of the stop time threshold may be set to 0x7fffff. The value 0x7fffff is actually the maximum value of a 32-bit integer. The value 0x7fffff, in seconds, is about more than 68 years, and thereby the stop time threshold can be approximately considered as being set to infinity.

According to some embodiments, a size of available memory of the electronic device can be determined in real time if the audio information and the text information corresponding to the audio information are stored in memory. According to some embodiments, a reserved memory space may be allocated in the electronic device. The reserved memory space can be a memory space required to ensure the normal operation of the system of the electronic device. According to some examples, if the available size of memory determined in real time is equal to the size of the reserved memory space, a time elapsed is determined as the stop time threshold.

According to other embodiments, when the audio information and the text information corresponding to the audio information are stored in a storage area of a cache memory, a size of the remaining space of the cache memory can be determined in real time. According to some embodiments, a reserved space may be allocated in the cache memory of the electronic device. According to some examples, a time elapsed is determined as the stop time threshold if the size of the remaining space determined in real time is equal to the size of the reserved space.

According to some embodiments, the reserved memory and/or the reserved space may vary according to the model of the electronic device. According to some embodiments, the reserved memory and/or the reserved space may also be associated with applications running on the electronic device. However, those skilled in the art should understand that the present disclosure is not limited to this, and the reserved memory and/or the reserved space can be determined in any way. Generally, the size of the reserved memory and/or the reserved space is not zero. However, in some cases, the size of the reserved memory and/or reserved space may be zero.

The following description will be given taking a preset condition that is the type of account associated with the electronic device as an example.

According to some embodiments, the audio information processing method may further include: verifying the type of account associated with the electronic device, wherein the type of account may include a subscription account and a non subscription account; and setting the stop time threshold to infinity in response to verifying that the type of account is a subscription account.

According to some embodiments, the stop time threshold can be equivalently set to infinity by no longer taking the stop time threshold as a condition for judging whether the audio recording stop condition is satisfied if it is verified that the type of account associated with the electronic device is a subscription account. According to some examples, for example, the condition about the judgment of the elapsed time obtained in real time can be directly changed to a constant TRUE. In these examples, it can also be considered that the stop time threshold is set to infinity (i.e., not constrained by the stop time threshold).

According to some embodiments, the subscription account may be a charging account or an exclusive account for the hearing impaired.

For an electronic device with a non subscription account, the audio word segmentation function can be only used with a time limit of no more than the stop time threshold. For an electronic device with a subscription account that is a charging account or an exclusive account for the hearing impaired, the audio word segmentation function can be used with no time limit. In this way, the copyright of audio word segmentation function can be effectively protected, special groups could be cared, thereby reflecting public welfare.

In some cases, the user may want to autonomously determine the time to stop audio recording.

According to some embodiments, the audio information processing method may further include: receiving an input for stopping audio recording on the user interface of the electronic device; and determining that the audio recording stop condition is satisfied in response to the input for stopping audio recording.

In this way, the user can stop collecting audio information associated with the electronic device through an input for stopping audio recording (for example, a click input on a button for stopping audio recording, a press input on a user interface (for example, the user interface 300), which can further improve the freedom of user operation and improve user experience.

The display of word-segmented text information according to exemplary embodiments of the present disclosure will be described below with reference to FIG. 4B. FIG. 4B is a schematic diagram showing a user interface 400B for displaying word-segmented text information on a user interface of the electronic device according to some exemplary embodiments of the present disclosure.

According to some embodiments and referring to FIG. 4B, the word-segmented text information includes at least one word segmentation unit 431, and the displaying the word-segmented text information on the user interface of the electronic device may include: displaying at least one word segmentation View Control 432; and making each of the at least one word segmentation unit 431 correspond to one of the at least one word segmentation View Control 432.

According to some embodiments, a word segmentation unit refers to a text information unit after word segmentation, which is part of the word-segmented text information. All word segmentation units constitute the word-segmented text information. For example, as shown in FIG. 4B, the text information may be "松下问童子, 言师采药去。" ("Beneath the pine, I asked the boy, the boy said that his master had gone for gathering herbs."). The word-segmented text information can include "松下", "问童子", ",", "言师", "采药去" and "。" ("Beneath the pine", "I asked the boy", ",", "the boy said that his master", "had gone for gathering herbs" and "。"). The word segmentation unit of the at least one word segmentation unit included in the word-segmented text information may be "松下" ("Beneath the pine"), or "问童子" ("I asked the boy"), or """, and so on. In other words, although the text information is word-segmented based on a certain word segmentation rule to obtain the word-segmented text information, the word-segmented text information still includes all the contents of the text information, and each word segmentation unit includes only part of the contents of the text information.

According to some embodiments, one word segmentation unit may be displayed in each word segmentation View Control. According to some embodiments, the word segmentation unit displayed in the word segmentation View Control can move following the movement of the word segmentation View Control.

In this way, the movement of each word segmentation unit corresponding to the word segmentation View Control can be controlled through the movement of the word segmentation View Control, for using by the user in subsequent operations of multiple types performed on the word segmentation unit, which is more convenient and can improve user experience.

Figure 5:
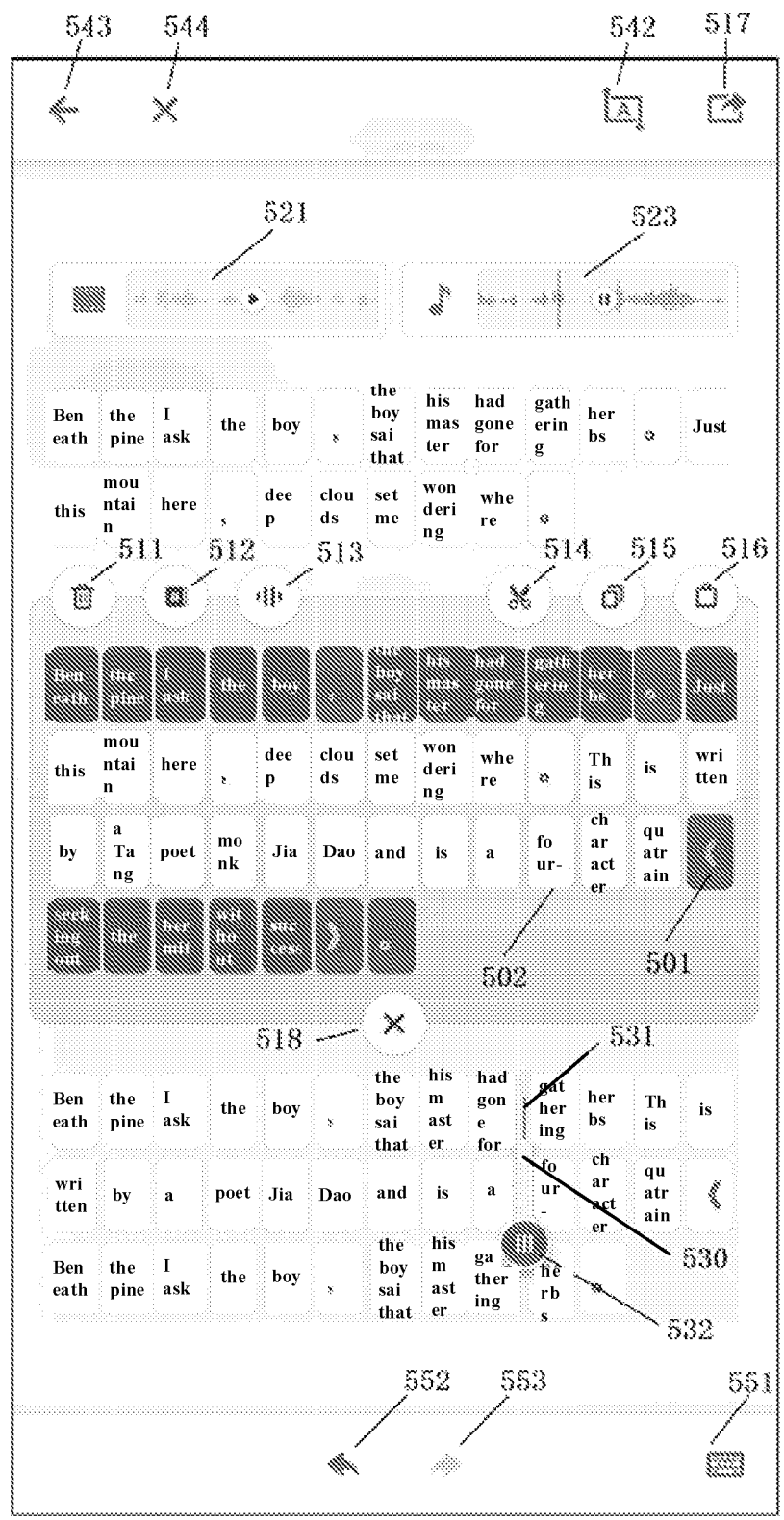
FIG. 5 is a schematic diagram showing a user interface for editing the word-segmented text information according to exemplary embodiments of the present disclosure.

Editing operations on the word-segmented text information will be described below with reference to FIG. 5. FIG. 5 is a schematic diagram showing a user interface 500 for editing the word-segmented text information according to exemplary embodiments of the present disclosure.

According to some embodiments, the audio information processing method may further include: receiving an operation instruction for one or more first word segmentation View Controls of the at least one word segmentation View Control, wherein the operation instruction includes one of a plurality of operations, the plurality of operations including at least one of Delete, Translate, Save, Cut, Copy, Paste, Share and Search operations; highlighting the one or more first word segmentation View Controls and/or the one or more first word segmentation units corresponding to the one or more first word segmentation View Controls; and operating the one or more first word segmentation View Controls and/or the one or more first word segmentation units corresponding to the one or more first word segmentation View Controls based on the operation contained in the operation instruction.

According to some embodiments, the operation instruction for one or more first word segmentation View Controls of the at least one word segmentation View Control may include the operation instruction to be issued to selected one or more first word segmentation View Controls after selecting one or more first word segmentation View Controls. For example, as shown in FIG. 5, the operation instruction for one or more first word segmentation View Controls of the at least one word segmentation View Control may include various operation instructions sent to the selected first word segmentation View Controls 502 after selecting a plurality of first word segmentation View Controls 502 corresponding to a plurality of first word segmentation units 501 (i.e., "松", "下", "问", "亲", "子", "'", "言", "师", "采", "药", "去", "○", "只", "(", "寻", "隐", "者", "不", "遇", ")" and "." corresponding to "beneath", "the pine", "I asked", "the", "boy", "'", "the boy said that", "his master", "had gone for", "gathering", "herbs", ".", "just", "(", "seeking out", "the", "hermit", "without", "success", ")" and "." respectively). For example, as shown in FIG. 5, the user can click Delete button 511, Translate button 512, Save button 513, Cut button 514, Copy button 515, Paste button 516, Share button 517, Search button (not shown), etc. to send various operation instructions to the selected various first word segmentation View Controls. According to some examples and referring to FIG. 5, some buttons 511-516 that are associated with the operation instructions can be displayed above the uppermost row of the selected first word segmentation View Controls 502. According to some embodiments and referring to FIG. 5, the selected first word segmentation View Controls 502 can be unselected in response to an input on Unselect button 518, and the selected first word segmentation View Controls 502 can no longer be highlighted. Certainly, the present disclosure is not limited to this. In addition to buttons, various operation instructions can be issued in other ways.

According to other embodiments, the operation instruction for one or more first word segmentation View Controls of the at least one word segmentation View Control may include the operation instruction may further include first selecting the operation instruction to be sent to the one or more first word segmentation View Controls, and then selecting the one or more first word segmentation View Controls.

According to some embodiments, highlighting the one or more first word segmentation View Controls and/or one or more first word segmentation units corresponding to the one or more first word segmentation View Controls may include: zooming in the one or more first word segmentation View Controls and/or the one or more first word segmentation units corresponding to the one or more first word segmentation View Controls, or changing the display color of the one or more first word segmentation View Controls and/or the one or more first word segmentation units corresponding to the one or more first word segmentation View Controls.

According to some embodiments, the one or more first word segmentation View Controls and the one or more first word segmentation units corresponding to the one or more first word segmentation VCs can be operated simultaneously based on the type of operation contained in the operation instruction. According to some examples, in the case of operation instructions being Delete, Cut, Copy and Paste operations, these operation instructions can act on the first word segmentation View Controls and the first word segmentation units corresponding to the first word segmentation View Controls simultaneously. For example, a deletion operation can delete both the first word segmentation View Controls and the first word segmentation units displayed in the first word segmentation View Controls.

According to some other embodiments, only the one or more first word segmentation units corresponding to the one or more first word segmentation View Controls can be operated based on the type of operation contained in the operation instruction. According to some examples, in the case of the operation instructions being Translate, Save, Share and Search operations, these operation instructions can only act on the first word segmentation units corresponding to the first word segmentation VCs. For example, the translation operation may translate only the first word segmentation units, and do nothing about the first word segmentation View Controls.

According to some embodiments, in addition to the above operations, text information can also be added on the basis of the word-segmented text information. According to some embodiments, in response to an input on button 551 as shown in FIG. 5, a soft keyboard or tablet may be displayed on the user interface of the electronic device for the user to input new text information.

In some cases, for example, when a finger is used to interact with the user interface of an electronic device, because the finger has a certain contact area when contacting the user interface, it may sometimes contact multiple word segmentation View Controls at the same time. In these cases, a Cursor Control can be used to replace a traditional cursor to locate at least one word segmentation View Control in a better way.

According to some embodiments and referring to FIG. 5, the audio information processing method may further include: displaying a Cursor Control 530 on the user interface of the electronic device when at least one word segmentation View control is being displayed, wherein the Cursor Control 530 includes a first end 531 and a second end 533, the first end 531 of the Cursor Control being used to locate at least one word segmentation View Control, and the second end 533 of the Cursor Control being selectable by the user.

According to some embodiments, the first end 531 of the Cursor Control may be in a slender shape to be positioned between desired two word segmentation View Controls. According to some embodiments, the second end 532 of the Cursor Control may have a certain display area suitable for selection by the user. The second end 532 of the Cursor Control may take any shape suitable for selection, such as a circular shape as shown in FIG. 5.

In this way, the user can move the entire Cursor Control by dragging the second end of the Cursor Control that can be easily selected to move the Cursor Control, so as to conveniently and accurately locate through the first end of the Cursor Control. This greatly improves the user's operation experience when editing the word-segmented text information.

According to some embodiments and referring to FIGS. 4B and 5, the audio information processing method may further include: displaying thumbnails 421 and 521 of the audio information on the user interface of the electronic device in response to determining that the audio recording stop condition is satisfied. According to some embodiments, the audio information processing method may further include: extracting speech information and non-speech information from the audio information; and displaying at least one of the thumbnail 422 of the speech information and the thumbnails 423, 523 of the non-speech information on the user interface of the electronic device in response to determining that the audio recording stop condition is satisfied.

According to some embodiments, the collected audio information associated with the electronic device may be played in response to a playback input on the thumbnails 421, 521 of the audio information. According to some embodiments, the speech information or the non-speech information may be played in response to a playback input on any one of the thumbnail 422 of the speech information and the thumbnails 423, 523 of the non-speech information.

In this way, not only the word-segmented text information but also the audio information can be operated after word segmentation of the text information of the audio information.

According to some embodiments, the audio information processing method may further include: saving the text information, the audio information, the speech information and/or the non-speech information in response to a Save input on a Save button displayed on the user interface of the electronic device.

According to some embodiments, the text information, the audio information, the speech information, and/or the non-speech information may be saved in various ways.

According to some embodiments and referring to FIG. 4B, the saving the text information, the audio information, the speech information and/or the non-speech information may include: creating a note page in the Note application and saving the text information in the new note page in response to a Save input on Save button 441 displayed on the user interface of the electronic device, and saving the audio information, the speech information and/or the non-speech information in an audio folder.

The method of saving text information usually includes: selecting text information to be saved; copying the text information to be saved; launching a text application such as Notepad; pasting the text information to be saved into the text application; and clicking a Save button in the text application. According to the saving method of the exemplary embodiments of the present disclosure, a note page can be automatically created in the note application and the text information can be directly saved in the note page in response to a Save input on Save button 441. In this way, compared with the usual method of saving text information, it can greatly reduce the operations required by the user when saving text information, and thereby improving the user's experience. In addition, different types of information (for example, text information and audio information) can be saved by one click, which may further reduce the operations of the user, and further improve the user's experience.

According to some embodiments, the way of saving the text information, the audio information, the speech information and/or the non-speech information can also be determined based on a user selection.

According to some embodiments, the saving the text information, the audio information, the speech information and/or the non-speech information may include: saving the text information, the audio information, the speech information and/or the non-speech information into a target folder or target application based on a selection for a saving target.

According to some embodiments, the selection for a save target may be a selection made in advance. For example, it can be preset by the user to save text information in a text application as a target application, and save audio information, speech information and/or non-speech information in an audio folder as a target folder.

According to some embodiments, the selection for a saving target may also be a selection that is made after the Save input. For example, options of various target folders and/or target applications may be displayed on the user interface in response to a Save input on a Save button displayed on the user interface of the electronic device. The selection for a saving target may be, for example, a click input on these options. According to some examples, the text information, the audio information, the speech information, and/or the non-speech information can be saved in a chat application according to the user's selection.

In this way, a variety of saving methods can be provided. The user can freely choose which target folder(s) or target application(s) to save the text information, the audio information, the speech information and/or the non-speech information as needed, without the need of changing the save location upon saving in a default saving method, which can reduce the operations.

Other buttons on the user interfaces 400B and 500 and their corresponding functions will be described below with reference with FIGS. 4B and 5. According to some embodiments, all word segmentation units can be selected in response to an input (e.g., a click input, a press input, a slide input) on Select All buttons 442, 542 shown in FIGS. 4B and 5. According to some embodiments, the user interface 400B shown in FIG. 4B can be switched to the user interface 500 shown in FIG. 5 in response to an input (e.g., a click input, a press input, a slide input) on Edit button 443 shown in FIG. 4B; moreover, the user interface 500 shown in FIG. 5 can be switched to the user interface 400B shown in FIG. 4B in response to an input on Return button 543 shown in FIG. 5. According to some embodiments, if the word-segmented text information contains many words that cannot be fully displayed in the current user interface 500, a previous page or a next page can be displayed in response to an input (e.g., a click input, a press input, a slide input) on Previous Page button 552 or on Next Page button 553 as shown in FIG. 5. According to some embodiments, the audio word segmentation function can be closed in response to an input (e.g., a click input, a press input, a slide input) on Close buttons 444, 544 as shown in FIGS. 4B and 5.

An exemplary audio information processing method according to the present disclosure has been described above with reference to the accompanying drawings. An exemplary audio information processing apparatus of the present disclosure and an exemplary electronic device will be further described below with reference to the accompanying drawings.

According to a second aspect of the present disclosure, there is provided an audio information processing method, including: determining whether an audio recording start condition is satisfied; collecting audio information associated with an electronic device in response to determining that the audio recording start condition is satisfied; recognizing text information corresponding to the audio information in real time during the collection of the audio information associated with the electronic device; and displaying the real-time recognized text information on a user interface of the electronic device.

According to some embodiments, the audio recording start condition is the same as or similar to the audio recording start condition described in detail in the first aspect of the present disclosure, and will not be repeated herein.

In this way, the user can see text information corresponding to the audio information in real time through the user interface of the electronic device during the collection of audio information associated with the electronic device. For example, the user can understand the content of the audio information through the text information displayed in real time if the electronic device is in a noisy external environment and it is difficult to hear the content of the audio information.

Figure 6:
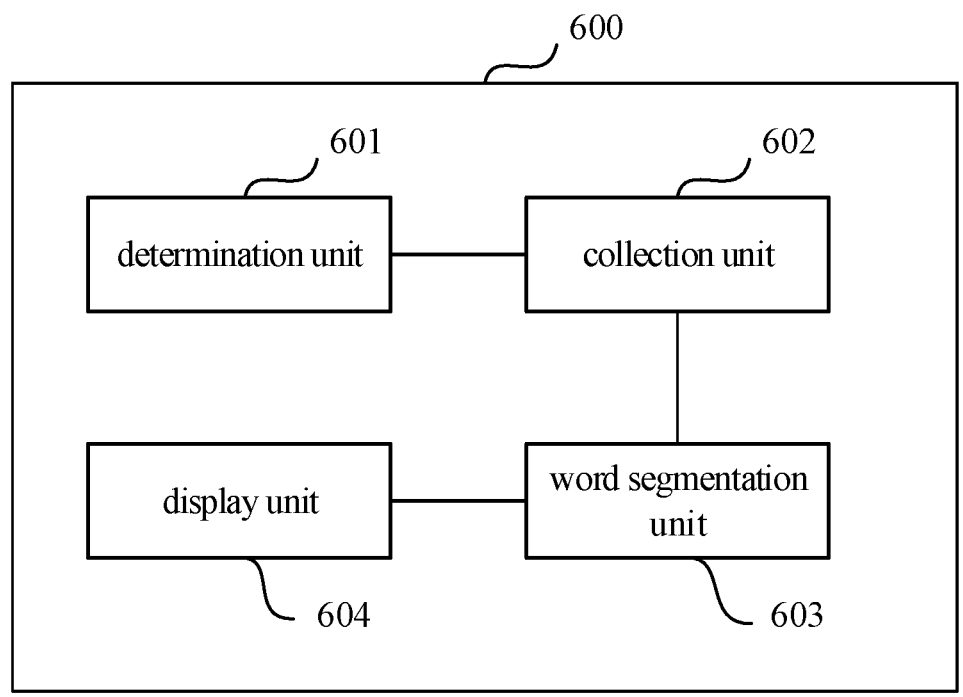
FIG. 6 is a block diagram showing the structure of an audio information processing apparatus according to exemplary embodiments of the present disclosure.

According to a third aspect of the present disclosure, there is provided an audio information processing apparatus. FIG. 6 is a block diagram showing the structure of an audio information processing apparatus according to exemplary embodiments of the present disclosure. As shown in FIG. 6, the audio information processing apparatus 600 may include: a determination unit 601 configured to determine whether an audio recording start condition is satisfied; a collection unit 602 configured to collect audio information associated with an electronic device in response to determining that the audio recording start condition is satisfied; a word segmentation unit 603 configured to perform word segmentation on text information corresponding to the audio information to obtain word-segmented text information; and a display unit 604 configured to display the word-segmented text information on a user interface of the electronic device.

According to some embodiments, the audio information processing apparatus 600 may further include units configured to perform other steps of any of the foregoing methods.

An exemplary audio information processing apparatus of the present disclosure has been briefly described above. It should be noted that, for the specific implementation of the units or features of the exemplary audio information processing apparatus of the present disclosure, reference can be made to the specific implementation of the corresponding features in the foregoing exemplary audio information processing method of the present disclosure, which will not be described in detail herein. In addition, units involved in the description of the exemplary audio information processing apparatus of the present disclosure may be implemented in software or in hardware. The names of the units do not constitute a limitation on the units themselves under certain circumstances.

In addition, the functions of the various units of the exemplary audio information processing apparatus of the present disclosure may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

According to a fourth aspect of the present disclosure, there is provided an electronic device including: a processor; and a memory storing a program, the program including instructions that, when executed by the processor, cause the processor to execute any of the foregoing methods.

According to a fifth aspect of the present disclosure, there is provided a storage medium for storing a program, the program including instructions that, when executed by a processor of an electronic device, cause the electronic device to execute any of the foregoing methods.

According to a sixth aspect of the present disclosure, there is provided a computer program product including a program, the program including codes that, when executed by a processor of an electronic device, cause the electronic device to execute any of the foregoing methods.

Figure 7:
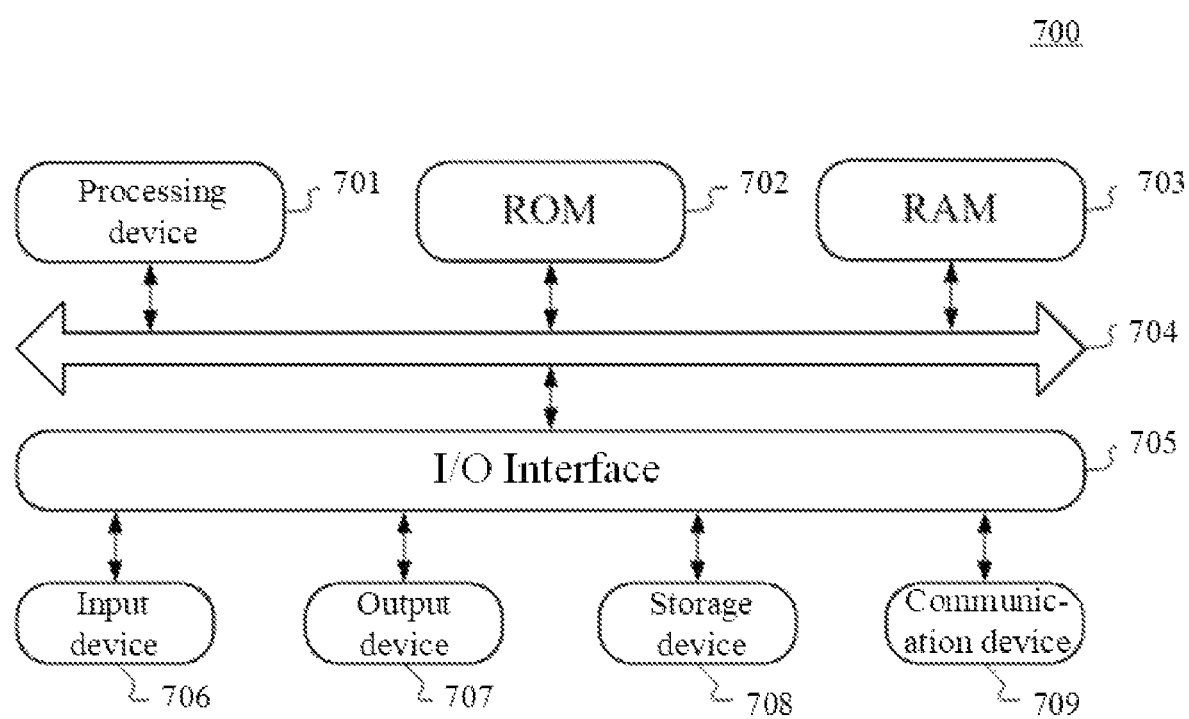
FIG. 7 is a block diagram showing the structure of an exemplary electronic device that can be applied to exemplary embodiments of the present disclosure.

Referring now to FIG. 7, a structural diagram of an electronic device 700 (e.g., the electronic device of the present disclosure) suitable for implementing an embodiment of the present disclosure is shown. The electronic device shown in FIG. 7 is merely an example and should not impose any limitation on the function and scope of the embodiment of the present disclosure.

As shown in FIG. 7, the electronic device 700 may include a processing device (e.g., a central processing unit, a graphics processor) 701, which may perform various appropriate actions and processes according to a program stored in Read Only Memory (ROM) 702 or a program loaded from storage device 706 into Random Access Memory (RAM) 703. In RAM 703, various programs and data required for the operation of the electronic device 700 are also stored. Processing device 701, ROM 702 and RAM 703 are connected to each other through bus 704. Input/Output (I/O) interface 705 is also connected to bus 704.

Generally, the following devices can be connected to I/O interface 705: input devices 706 including, for example, a touch screen, a touch pad, a keyboard, a mouse, a camera, a microphone, an accelerometer, a gyroscope, etc.; output devices 707 including a liquid crystal display (LCD), a speaker, a vibrator, etc.; storage devices 706 including, for example, a magnetic tape driver, a hard disk driver, etc.; and a communication device 709. The communication device 709 enables the electronic device 700 to communicate wirelessly or wirelessly with other devices to exchange data.

Although FIG. 7 shows the electronic device 700 with various components, it should be understood that it is not required to implement or have all of these components. Alternatively, more or fewer components can be implemented or provided.

In particular, according to embodiments of the present disclosure, the processes described above with reference to the flowchart can be implemented as a computer software program. For example, an embodiment of the present disclosure includes a computer program product, which includes a computer program carried on a non-transitory computer readable medium, and containing program code for executing the method shown in the flowchart. In such an embodiment, the computer program may be downloaded and installed from the network through the communication device 709, or installed from the storage device 706, or from the ROM 702. When the computer program is executed by the processing device 701, the above functions defined in the method of the embodiment of the present disclosure are performed.

It should be noted that the above storage medium of the present disclosure can be a computer-readable storage medium. The computer readable storage medium can be, for example, but not limited to, an electronic, magnetic, optical, electromagnetic, infrared, or semiconductor system, apparatus, or device, or any combination of the above. More specific examples of the computer readable storage medium may include, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, including but not limited to wire, fiber optic cable, RF (radio frequency), etc., or any suitable combination of the foregoing.

In some embodiments, examples of communication networks include a Local Area Network ("LAN"), a Wide Area Network ("WAN"), an Internet (e.g., the Internet), and an end-to-end network (e. g., an ad hoc end-to-end network), as well as any currently known or future developed network.

The above computer-readable medium may be included in the electronic device described above; or it may exist alone without being assembled into the electronic device.

The computer-readable medium carries one or more programs that cause, when executed by the electronic device, the electronic device to determine whether an audio recording start condition is satisfied; collect audio information associated with an electronic device in response to determining that the audio recording start condition is satisfied; perform word segmentation on text information corresponding to the audio information to obtain word-segmented text information; and display the word-segmented text information on a user interface of the electronic device.

The computer program code for executing operations of the present disclosure may be complied by any combination of one or more program design languages, the program design languages including object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the circumstance relating to the remote computer, the remote computer may be connected to the user computer through various kinds of networks, including local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of thereof. More specific examples of the machine-readable storage medium may include electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept. For example, technical solutions formed by replacing the above features with technical features having similar functions to those disclosed in the present disclosure (but not limited to).

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. An audio information processing method, comprising:
receiving an input indicating audio processing on the user interface of the electronic device;
determining whether an audio recording start condition is satisfied;
collecting audio information associated with an electronic device in response to determining that the audio recording start condition is satisfied;
performing word segmentation on text information corresponding to the audio information to obtain word-segmented text information; and
displaying the word-segmented text information on a user interface of the electronic device;
the determining whether an audio recording start condition is satisfied comprises:
determining whether the user interface of the electronic device is displaying an application window when receiving the input indicating audio processing;
determining whether audio recording is allowable for the application window in response to determining that the user interface of the electronic device is displaying the application window when receiving the input indicating audio processing; and
determining that the audio recording start condition is satisfied in response to determining that audio recording is allowable for the application window; and
determining that the audio recording start condition is satisfied in response to determining that the user interface of the electronic device is not displaying the application window when receiving the input indicating audio processing.

2. An audio information processing method, comprising:
receiving an input indicating audio processing on the user interface of the electronic device;
determining whether an audio recording start condition is satisfied;
collecting audio information associated with an electronic device in response to determining that the audio recording start condition is satisfied;
performing word segmentation on text information corresponding to the audio information to obtain word-segmented text information; and
displaying the word-segmented text information on a user interface of the electronic device;
the determining whether an audio recording start condition is satisfied comprises:
obtaining a location of the input indicating audio processing on the user interface of the electronic device;
determining whether the location on the user interface of the electronic device belongs to a text extractable area; and
determining that the audio recording start condition is satisfied in response to determining that the location on the user interface of the electronic device does not belong to a text-extractable area.

3. The audio information processing method according to claim 2, wherein the determining whether an audio recording start condition is satisfied comprises: determining that the audio recording start condition is satisfied in response to receiving an input indicating audio processing on the user interface of the electronic device.

4. The audio information processing method according to claim 3, wherein the receiving an input indicating audio processing on the user interface of the electronic device comprises:
receiving an input for showing a function menu on the user interface of the electronic device;
displaying a function selection menu on the user interface of the electronic device in response to receiving the input for showing a function menu, wherein the function selection menu comprises an audio word segmentation option; and
receiving a selection for the audio word segmentation option.

5. The audio information processing method according to claim 2, wherein the receiving an input indicating audio processing on the user interface of the electronic device comprises:
receiving an input for showing a function menu on the user interface of the electronic device;
displaying a function selection menu on the user interface of the electronic device in response to receiving the input for showing a function menu, wherein the function selection menu includes an audio word segmentation option; and
receiving an input for the audio word segmentation function option.

6. The audio information processing method according to claim 2, wherein the collecting audio information associated with the electronic device comprises at least one of:
collecting audio information from the interior of the electronic device in real time; or
collecting audio information from the exterior of the electronic device in real time.

7. The audio information processing method according to claim 6, wherein the collecting audio information from the interior of the electronic device in real time comprises:
creating an underlying hardware path, the underlying hardware path comprises an interface provided by a hardware abstraction layer; and
collecting audio information from an underlying hardware as the audio information from the interior of the electronic device in real time through the underlying hardware path in response to determining that the audio recording start condition is satisfied.

8. The audio information processing method according to claim 7, further comprising:
creating the hardware abstraction layer adapted to configure the underlying hardware path to provide an interface for audio information collected from the underlying hardware; and
creating a virtual audio information input device configured to invoke the hardware abstraction layer when it is determined that the audio recording start condition is satisfied to collect audio information from the underlying hardware in real time by accessing the underlying hardware through the interface provided by the underlying hardware path.

9. The audio information processing method according to claim 2, further comprising:
recognizing text information corresponding to the audio information in real time during the collection of the audio information associated with the electronic device; or
displaying a waveform associated with the audio information on the user interface of the electronic device in real time during the collection of the audio information associated with the electronic device.

10. The audio information processing method according to claim 9, further comprising:
displaying the real-time recognized text information on the user interface of the electronic device in real time.

11. The audio information processing method according to claim 9, further comprising:
receiving a first switch input for the waveform associated with the audio information;
displaying the real-time recognized text information on the user interface of the electronic device in response to the first switch input; and
receiving a second switch input for the real-time recognized text information;
displaying the waveform associated with the audio information on the user interface of the electronic device in response to the second switch input.

12. The audio information processing method according to claim 2, wherein the performing word segmentation on text information corresponding to the audio information comprises:
performing word segmentation on the text information based on at least one of: word segmentation with characters or letters as units, word segmentation with words as units, word segmentation with phrases as units, word segmentation with clauses as units, word segmentation with sentences as units, or word segmentation with punctuations as units.

13. The audio information processing method according to claim 12, wherein the performing word segmentation on text information corresponding to the audio information further comprises:
determining language of the text information; and
performing word segmentation on the text information based on the language.

14. The audio information processing method according to claim 2, wherein the performing word segmentation on text information corresponding to the audio information comprises:
comparing a word number of text information with a word number threshold; and
performing word segmentation on all the text information if the word number of the text information is less than or equal to the word number threshold, and performing word segmentation on a portion of the text information if the word number of the text information is greater than the word number threshold.

15. The audio information processing method according to claim 2, wherein the performing word segmentation on text information corresponding to the audio information comprises:
determining whether an audio recording stop condition is satisfied; and
performing word segmentation on text information corresponding to the audio information in response to that the audio recording stop condition is satisfied.

16. The audio information processing method according to claim 15, further comprising:
acquiring an elapsed time since the start of the collection of the audio information associated with the electronic device in real time; and
determining that the audio recording stop condition is satisfied if the elapsed time acquired in real time is greater than or equal to a stop time threshold.

17. The audio information processing method according to claim 2, further comprising:
receiving an input for stopping audio recording on the user interface of the electronic device; and
determining that the audio recording stop condition is satisfied in response to the input for stopping audio recording.

18. The audio information processing method according to claim 2, wherein the word-segmented text information comprises at least one word segmentation unit, and displaying the word-segmented text information on the user interface of the electronic device comprises:
displaying at least one word segmentation View Control; and
making each of the at least one word segmentation unit correspond to one of the at least one word segmentation View Control.

19. The audio information processing method according to claim 18, wherein the method further comprises:
receiving an operation instruction for one or more first word segmentation View Controls of the at least one word segmentation View Control, wherein the operation instruction comprises one of a plurality of operation types, the plurality of operation types comprising at least one of Delete, Translate, Save, Cut, Copy, Paste, Share or Search operations;
highlighting the one or more first word segmentation View Controls and/or the one or more first word segmentation units corresponding to the one or more first word segmentation View Controls; and
operating the one or more first word segmentation View Controls and/or the one or more first word segmentation units corresponding to the one or more first word segmentation View Controls based on the operation type comprised in the operation instruction; or
the method further comprises:
displaying a Cursor Control on the user interface of the electronic device when displaying at least one word segmentation View Control,
wherein the Cursor Control comprises a first end for locating at least one word segmentation View Control and a second end selectable by the user.

20. The audio information processing method according to claim 2, further comprising:

displaying a thumbnail of the audio information on the user interface of the electronic device in response to determining that the audio recording stop condition is satisfied.

21. The audio information processing method according to claim 20, further comprising:
extracting speech information and non-speech information from the audio information; and
displaying at least one of a thumbnail of the speech information or a thumbnail of the non-speech information on the user interface of the electronic device in response to determining that the audio recording stop condition is satisfied.

22. An electronic device, comprising:
a processor; and
a memory storing a program, the program comprising instructions that, when executed by the processor, cause the processor to execute the audio information processing method according to claim 2.

23. A non-transitory storage medium storing a program, the program comprising instructions that, when executed by a processor of an electronic device, cause the electronic device to execute the audio information processing method according to claim 2.

24. An audio information processing method, comprising:
receiving an input indicating audio processing on the user interface of the electronic device;
determining whether an audio recording start condition is satisfied;
collecting audio information associated with an electronic device in response to determining that the audio recording start condition is satisfied;
recognizing text information corresponding to the audio information in real time during the collection of the audio information associated with the electronic device; and
displaying the real-time recognized text information on a user interface of the electronic device;
wherein the determining whether an audio recording start condition is satisfied comprises:
obtaining a location of the input indicating audio processing on the user interface of the electronic device;
determining whether the location on the user interface of the electronic device belongs to a text extractable area; and
determining that the audio recording start condition is satisfied in response to determining that the location on the user interface of the electronic device does not belong to a text-extractable area.

* * * * *